United States Patent
Oku et al.

(10) Patent No.: US 7,059,772 B2
(45) Date of Patent: Jun. 13, 2006

(54) HYDRODYNAMIC BEARING, SPINDLE MOTOR USING THE SAME AND DISC DRIVE APPARATUS PROVIDED WITH SPINDLE MOTOR

(75) Inventors: Yoshito Oku, Kyoto (JP); Yusuke Matsumoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 125 days.

(21) Appl. No.: 10/708,758

(22) Filed: Mar. 24, 2004

(65) Prior Publication Data

US 2004/0165797 A1   Aug. 26, 2004

(30) Foreign Application Priority Data

Mar. 24, 2003  (JP)  ............................. 2003-079928

(51) Int. Cl.
*F16C 32/06*   (2006.01)
(52) U.S. Cl. ....................... 384/119; 384/132
(58) Field of Classification Search ................ 384/100, 384/107, 113, 114, 119, 124, 132
See application file for complete search history.

(56) References Cited

U.S. PATENT DOCUMENTS

| | | | |
|---|---|---|---|
| 5,423,612 A * | 6/1995 | Zang et al. .................. | 384/119 |
| 5,558,445 A | 9/1996 | Chen et al. | |
| 5,765,952 A * | 6/1998 | Dekker et al. ............... | 384/132 |
| 5,876,124 A | 3/1999 | Zang et al. | |
| 6,296,391 B1 * | 10/2001 | Hayakawa et al. .......... | 384/119 |
| 6,485,179 B1 * | 11/2002 | Takahashi et al. ........... | 384/132 |
| 6,854,889 B1 * | 2/2005 | Nishimura et al. .......... | 384/119 |
| 2002/0130571 A1 | 9/2002 | Kodama | |
| 2003/0030222 A1 | 2/2003 | Grantz et al. | |

FOREIGN PATENT DOCUMENTS

| JP | A-105446 | 4/1996 |
|---|---|---|
| JP | A-073126 | 3/1998 |
| JP | A-2002-165407 | 6/2002 |

\* cited by examiner

*Primary Examiner*—Thomas R. Hannon
(74) *Attorney, Agent, or Firm*—Judge Patent Firm (57) ABSTRACT

The present invention relates to a hydrodynamic bearing supporting a shaft and a sleeve so as to relatively rotate with respect to a rotation axis. In accordance with one example of the present invention, there is provided a hydrodynamic bearing in which a capillary seal portion is formed continuously in a bearing portion having a lubricating oil retained in a micro gap as a working fluid. The capillary seal portion is provided with a first capillary seal portion having a first radial gap, a dimension of the first radial gap being getting at least wider in accordance with increasing a distance from the bearing portion in the rotation axis, and a second capillary seal portion adjoining the first capillary seal portion and having a second radial gap, a dimension of the second radial gap being getting at least wider in accordance with increasing a distance from the bearing portion in the rotation axis. The second capillary seal portion is expanded progressively in accordance with getting toward an outer side in an axial direction.

15 Claims, 6 Drawing Sheets

Prior art

HYDRODYNAMIC BEARING, SPINDLE MOTOR USING THE SAME AND DISC DRIVE APPARATUS PROVIDED WITH SPINDLE MOTOR

BACKGROUND OF INVENTION

1. Field of the Invention

The present invention relates to a hydrodynamic bearing, a spindle motor using the same and a disc drive apparatus provided with the spindle motor.

2. Description of the Prior Art

As a bearing for rotatably supporting a rotor of a spindle motor used for a disc drive apparatus such as a hard disc drive or the like, it is started to employ a hydrodynamic bearing which is quiet, has a low vibration and can obtain a stable rotation.

Figure 4:
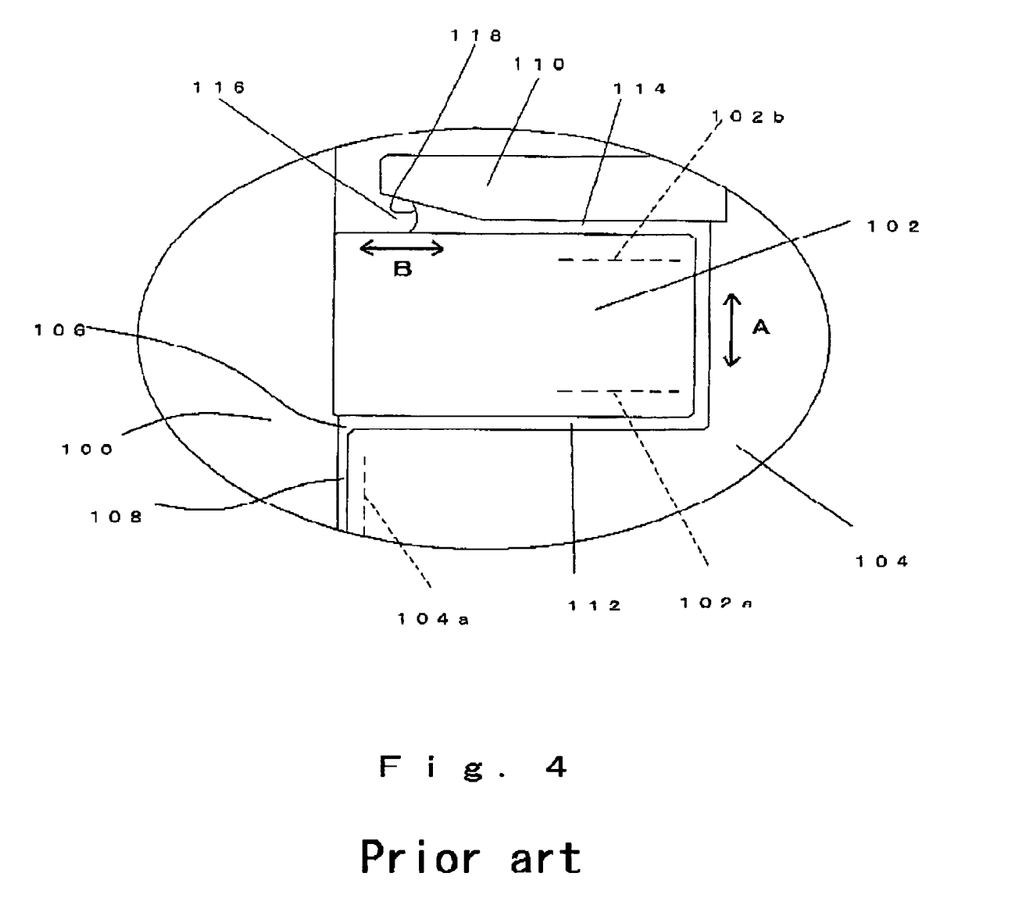
FIG. 4 is a partly enlarged cross sectional view schematically showing a skeleton structure of a conventional hydrodynamic bearing portion near a thrust plate.

As the hydrodynamic bearing mentioned above, for example, there is U.S. Pat. No. 5,423,612. FIG. 4 shows a partly schematic structure of U.S. Pat. No. 5,423,612 mentioned above as a partly enlarged cross sectional view.

A thrust plate 102 is fixed to a fixed shaft 100, and a lubricating oil 106 corresponding to a working fluid is retained between an outer peripheral surface of the fixed shaft 100 positioned in a lower side of the thrust plate 102 in an axial direction, and an outer peripheral surface of a rotor 104 opposing to the outer peripheral surface in a radial direction. Further, a radial bearing portion 108 is structured by forming a radial dynamic pressure generating groove 104a which generates a supporting pressure for supporting a radial load applied to the rotor 104 by moving the lubricating oil 106 in a predetermined direction, at a rotating time of the rotor 104, on an inner peripheral surface of the rotor 104.

Further, the lubricating oil 106 is retained continuously between an axial lower end surface of the thrust plate 102 and an axial upper end surface of the rotor 104 opposing to the axial lower end surface in the axial direction, and between an axial upper end surface of the thrust plate 102 and a thrust bush 110 mounted to the rotor 104 opposing to the axial upper end surface in the axial direction. Further, a pair of thrust bearing portions 112 and 114 are structured by forming thrust dynamic pressure generating grooves 102a and 102b which generate a supporting pressure for supporting an axial load applied to the rotor 104 by moving the lubricating oil 106 in a predetermined direction, at a rotating time of the rotor 104, on the lower end surface and the upper end surface of the thrust plate 102.

In the case of the hydrodynamic bearing having the lubricating oil 106 as the working fluid, a taper-shaped seal gap is formed in an end portion of the bearing portion, and a gas-liquid interface between the lubricating oil and the air is formed and retained within the taper-shaped seal gap (refer to a capillary seal portion 116 in FIG. 4).

In the capillary seal portion in the hydrodynamic bearing, a difference is generated in a capillary force of the lubricating oil in correspondence to a position where the boundary surface of the lubricating oil is formed, by being progressively expanding a gap dimension of the gap formed within the capillary seal portion in correspondence to being apart from the bearing portion. Accordingly, in the case that an amount of the lubricating oil retained in the bearing portion is reduced, lubricating oil is supplied from the capillary seal portion, and in the case that a volume of the lubricating oil retained within the bearing portion is increased due to a temperature increase of the like, the increased amount is received.

Further, in a capillary seal portion 116 illustrated in FIG. 4, a gas-liquid interface 118 between the air and the lubricating oil 106 which is communicated with an external portion of the bearing portion through the radial gap between the shaft 100 and the thrust bush 110 is formed in a meniscus shape directed to an inner side in a radial direction. In accordance with the structure, since a centrifugal force is applied so as to press the gas-liquid interface 118 to an outer side in the radial direction, that is, toward the thrust bearing portions 112 and 114, at a time when the rotor 104 rotates at a high speed, it is possible to more effectively prevent the lubricating oil 106 from leaking to the external portion of the bearing portion.

In this case, during the use of the spindle motor mentioned above, a vibration and an impact force (hereinafter, described as an external shock) is applied to the rotor 104 from the external portion due to various causes. In the case that the external shock is applied at the rotating time of the rotor 104, there is a low possibility that a vibration and a turbulence in attitude are generated in the rotor 104 on the basis of a damping effect caused by a dynamic pressure generated in the thrust bearings 102a and 102b and the radial bearing portion 108 and a viscosity of the lubricating oil 106. However, since no dynamic pressure is generated at a time when the rotation of the spindle motor is stopped, only the viscosity of the lubricating oil 106 stands against the external shock of the motor.

In the case of the structure shown in FIG. 4, when the external shock is applied to the spindle motor in a state in which the spindle motor stops, the rotor 104 oscillates vertically in the axial direction as shown by an arrow A. In this case, since the gap in the axial direction is formed in each of the thrust bearing portions 102a and 102b and the capillary seal portion 116, the axial dimension of the gap is changed in both of the thrust bearing portions 102a and 102b and the capillary seal portion 116, on the basis of the oscillation of the rotor 104 caused by the external shock. In addition, the gas-liquid interface 118 oscillates in a radial direction as shown by an arrow B, in accordance with a change of the gap in the axial dimension.

In the case that the rotor 104 oscillates downward in the axial direction as shown by the arrow A at this time, the axial dimension of the seal gap is narrowed in the capillary seal portion 116, in addition to the gap of the thrust bearing portion 114 formed between the thrust plate 102 and the thrust bush 110. Accordingly, the gas-liquid interface 118 of the capillary seal portion 116 is in a state of swelling out to the inverse direction to the meniscus shape illustrated in FIG. 4, that is, to the inner side in the radial direction. Further, in the case that the external shock applied to the rotor 104 is more than a surface tension of the lubricating oil 106, a breakage of the gas-liquid interface 118 is caused, and the lubricating oil 106 is scattered to the external portion of the bearing.

The lubricating oil 106 scattered to the external portion of the bearing portion by the breakage of the gas-liquid interface 118 contaminates the internal portion and the external portion of the spindle motor in accordance with the rotation of the rotor 104. For example, in the case that the scattered lubricating oil 106 is attached to a recording surface of a recording disc such as a hard disc or the like mounted to the rotor 104, and a head reading and writing a recording date with respect to the recording disc, it is hard to read and write the recording data so as to cause generation of a read and write error in the recording data, so that a reliability of the disc drive apparatus is deteriorated.

Further, when the lubricating oil 106 is scattered to the external portion of the bearing portion, a retaining amount of the lubricating oil 106 is insufficient in the internal portion of the bearing portion, a bearing rigidity is lowered, and a rotation support of the rotor 104 is unstable. In addition, a contact sliding is generated between the thrust plate 102, and the shaft 100 and the rotor 104 due to a deplete of the retaining amount in the lubricating oil 106, so that there is a case that a seizure is generated.

In this case, in U.S. Pat. No. 2003-0030222, there is disclosed a structure in which the capillary seal portion is formed not in a direction orthogonal to the rotation axis but in a direction inclined to the rotation axis. In accordance with the structure of the capillary seal portion mentioned above, it is possible to make a volumetric capacity of the capillary seal portion larger than that of the structure in FIG. 4, however, since the capillary seal portion is affected by the change of the gap dimension caused by the oscillation of the rotor in the axial direction, a resistance property comes short against the external shock at a time when the rotation of the motor stops as mentioned above.

SUMMARY OF INVENTION

An object of the present invention is to maintain a seal strength of a capillary seal portion high even when a spindle motor is rotated at a high speed, to increase a volumetric capacity within the capillary seal portion, and to allow a sufficient amount of lubricating oil to be retained.

Further, another object of the present invention is to reinforce a resistance property against an external shock at a time when the spindle motor stops rotating.

Further, the other object of the present invention is to prevent the lubricating oil from being scattered to an external portion of the bearing with respect to the external shock at a time when the spindle motor stops rotating.

Further, the other object of the present invention is to provide a hydrodynamic bearing, a spindle motor and a disc drive apparatus which achieve the objects mentioned above and are excellent in a reliability and a durability.

In order to achieve the object mentioned above, in accordance with one aspect of the present invention, there is provided a hydrodynamic bearing in which a capillary seal portion is formed continuously in a bearing portion having a lubricating oil retained in a micro gap as a working fluid. The capillary seal portion is provided with a first capillary seal portion having a first radial gap, a dimension of the first radial gap being getting at least wider in accordance with increasing a distance from the bearing portion in a rotation axis. And the capillary seal portion is provided with a second capillary seal portion adjoining the first capillary seal portion and having a second radial gap, a dimension of the second radial gap being getting at least wider in accordance with increasing a distance from the bearing portion in the rotation axis. The second capillary seal portion is expanded progressively in accordance with getting toward an outer side in an axial direction.

In accordance with the aspect of the hydrodynamic bearing on the basis of the present invention, since it is possible to simultaneously achieve an expansion of a volumetric capacity of the capillary seal portion and a reinforcement of a resistance property against the external shock, it is possible to prevent the lubricating oil from being scattered to the external portion of the bearing portion even at a time when the spindle motor is rotated at a high speed. Further, since the second capillary seal portion is expanded progressively toward the outer side in the axial direction, the lubricating oil retained in the second capillary seal portion at a time when the spindle motor is rotated at the high speed is pressed to the side of the first capillary seal portion on the basis of the centrifugal force, whereby it is possible to reinforce a seal strength of the second capillary seal portion. Further, since the second capillary seal portion is expanded progressively toward the outer side in the axial direction, it is possible to reinforce the resistance property against the external shock from the axial direction at a time when the spindle motor stops rotating, and it is possible to prevent the lubricating oil from being scattered to the external portion of the bearing portion, so that an application range of the hydrodynamic bearing is expanded, it is possible to prevent the lubricating oil from coming short of the retaining amount within the bearing portion, and it is possible to improve a durability and a reliability.

DETAILED DESCRIPTION

A description will be given below of an embodiment of a hydrodynamic bearing, a spindle motor using the hydrodynamic bearing and a disc drive apparatus provided with the spindle motor in accordance with the present invention with reference to FIGS. 1 to 3 and FIG. 5. In this case, in the description of the embodiment of the present invention, a vertical direction in each of the drawings is regarded as a vertical direction as a matter of convenience, however, this does not limit a direction in an actual mounting state.

Figure 1:
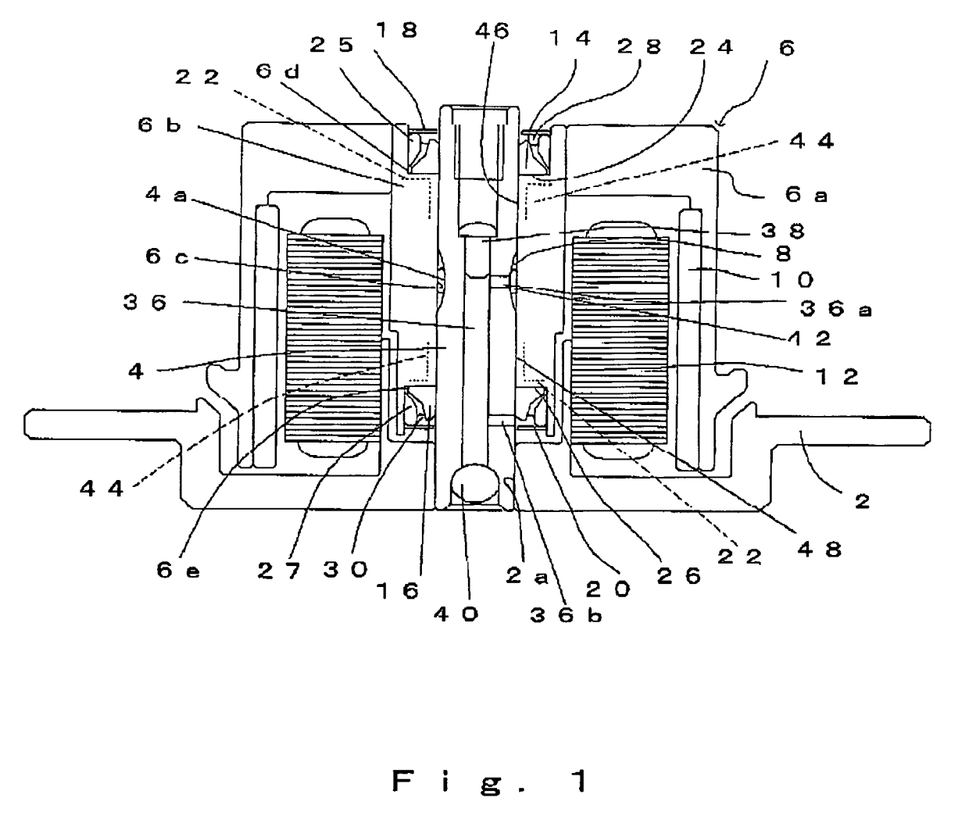
FIG. 1 is a cross sectional view schematically showing a skeleton structure of a spindle motor in accordance with an example of the present invention.

A spindle motor illustrated in FIG. 1 is provided with a bracket 2, a shaft 4 which is fixed to the bracket 2, and a rotor 6 which is supported to the shaft 4 via a hydrodynamic bearing so as to freely rotate with each other.

A center hole 2a to which one end portion of the shaft 4 is fitted and fixed is formed in a center of the bracket 2 corresponding to a stationary member.

The rotor 6 corresponding to a rotating member is provided with a sleeve 6b which opposes to the shaft 4 via a hydrodynamic bearing portion, and a rotor hub 6a which is outward fitted and fixed to an outer peripheral portion of the sleeve 6b. The rotor hub 6a is an annular member which is formed in an approximately cup shape and is made of a stainless steel having a small thermal expansion coefficient or the like. A recording disc (illustrated as a disc plate 53 in FIG. 3) such as a hard disc or the like is mounted to an outer peripheral surface of a peripheral wall portion constituting an outer wall of the rotor hub 6a, and a rotor magnet 10 is firmly fixed to an inner peripheral surface of the peripheral wall portion in accordance with an adhesive bonding or the like. The rotor magnet 10 opposes to a stator 12 fixed to the bracket 2 via a gap in a radial direction. The sleeve 6b is an annular member which is formed in a hollow cylindrical shape from a comparatively soft metal such as a copper, a copper alloy or the like, taking a processing characteristic into consideration. A bearing hole 6c inserted to the shaft 4 and penetrating in an axial direction is formed in a center of the sleeve 6b, and the bearing hole 6c is rotatably supported to the shaft 4.

Further, in an upper portion and a lower portion of the shaft 4, there are respectively mounted a disc-shaped upper thrust plate (corresponding to a shaft annular member) 14 and a lower thrust plate 16 which protrude to an outer side in a radial direction. An upper step portion 6d and a lower step portion 6e respectively having diameters larger than outer diameters of the upper and lower thrust plates 14 and 16 are formed in positions of the bearing hole 6c in correspondence to the upper thrust plate 14 and the lower thrust plate 16. An upper seal cap 18 and a lower seal cap 20 are mounted to an upper side and a lower side in an axial direction of the upper step portion 6d and the lower step portion 6e, and the upper step portion 6d and the lower step portion 6e are closed by the upper seal cap 18 and the lower seal cap 20.

A lubricating oil 8 continuously fills up a micro gap between an outer peripheral surface of the shaft 4 and an inner peripheral surface of the sleeve 6b opposing thereto in the radial direction, and a micro gap between a lower surface (an inner surface in the axial direction) of the upper thrust plate 14 and a flat surface of the upper step portion 6d in the sleeve 6b opposing thereto in the axial direction. Further, a dynamic pressure generating groove 22 for generating a dynamic pressure in the lubricating oil 8 in accordance with a rotation of the rotor 6 is formed in the flat surface of the upper step portion 6d, whereby an upper thrust bearing portion 24 is structured.

The lubricating oil 8 continuously fills up the micro gap between the outer peripheral surface of the shaft 4 and the inner peripheral surface of the sleeve 6b opposing thereto in the radial direction, and a micro gap between an upper surface (an inner surface in the axial direction) of the lower thrust plate 16 and a flat surface of the lower step portion 6e in the sleeve 6b opposing thereto in the axial direction. Further, the dynamic pressure generating groove 22 for generating the dynamic pressure in the lubricating oil 8 in accordance with the rotation of the rotor 6 is formed in the flat surface of the lower step portion 6e, whereby a lower thrust bearing portion 26 is structured.

The dynamic pressure generating groove 22 formed in the thrust bearing portions 24 and 26 employs a pump-in type spiral groove in such a manner that the generated dynamic pressure can pressure feeds the lubricating oil 8 toward the shaft 4. In this case, the dynamic pressure generating groove can be formed in the upper surface and the lower surface of the upper and lower thrust plates 14 and 16, or in the flat surfaces of the upper and lower step portions 6d and 6e, and both the flat surfaces of the upper and lower step portions 6d and 6e and the upper surface and the lower surface of the upper and lower thrust plates 14 and 16.

As mentioned above, since the dynamic pressure generating groove 22 in the upper and lower thrust bearing portions 24 and 26 is formed as the spiral groove, it is possible to make the outer diameters of the upper and lower thrust plates 14 and 16 smaller in comparison with the case employing a herringbone groove. Accordingly, it is possible to reduce an influence which the lower thrust bearing portion 26 applies to a magnetic circuit portion constituted by the rotor magnet 10 and the stator 12, and it is possible to obtain a sufficient driving torque. Further, since the spiral groove has a smaller viscous resistance of the lubricating oil 8 generated at a time when the spindle motor rotates, in comparison with the herringbone groove, it is possible to reduce a loss in the upper and lower thrust bearing portions 24 and 26, and it is possible to improve an electric efficiency of the spindle motor. As a result, it is possible to restrict an electric power consumption of the spindle motor.

Figure 2:
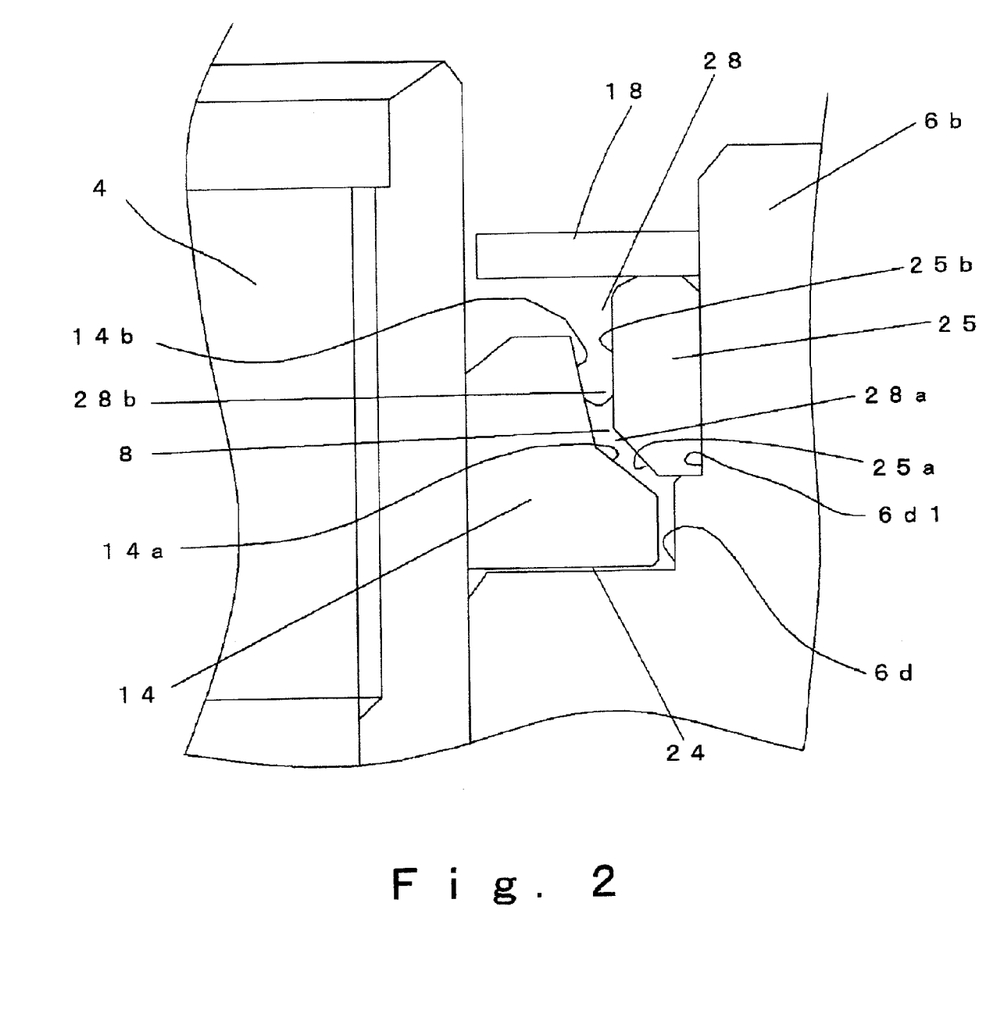
FIG. 2 is a partly enlarged cross sectional view schematically showing a skeleton structure of the spindle motor shown in FIG. 1 near an upper thrust plate.

As shown in FIG. 2 in a partly enlarged manner, in the outer peripheral surface of the upper thrust plate 14, there are formed a first conical surface 14a which extends in approximately parallel to a rotation axis from an outer peripheral end portion of the lower surface in the upper thrust plate 14 and thereafter extends toward a radially inner side in a direction inclined to the rotation axis, and a second conical surface 14b which is continuously provided in the outer end portion of the first conical surface 14a in the axial direction and has a inclination angle with respect to the rotation axis smaller than the first conical surface 14a (closer to parallel with respect to the rotation axis).

Further, a small step portion 6d1 is formed in the inner peripheral surface of the upper step portion 6d by partly notching the inner peripheral surface of the upper step portion 6d, and an annular upper ring-shaped member (corresponding to the sleeve annular member) 25 is firmly fixed to the small step portion 6d1 in accordance with an adhesive bonding, a press fitting or the like.

In an inner peripheral surface of the upper ring-shaped member 25, there are formed an inclined surface (corresponding to a first inner peripheral surface) 25a which opposes to the first conical surface 14a of the upper thrust plate 14 in the radial direction and extends toward the inner side in the radial direction from the flat surface of the small step portion 6d1 in the direction inclined to the rotation axis, and a vertical wall (corresponding to a second inner peripheral surface) 25b which is continuously provided in an outer end portion of the inclined surface 25a in the axial direction and is substantially parallel to a rotation axis extending toward an outer side in the axial direction from the upper thrust bearing portion 24. Further, a first capillary seal portion 28a is formed in a gap between the inclined surface 25a of the upper ring-shaped member 25 and the first conical surface 14a in such a manner that a dimension of the gap is expanded progressively toward the outer side in the axial direction from the upper thrust bearing portion 24. In the same manner, a second capillary seal portion 28b is formed in a gap between the vertical wall 25b of the upper ring-shaped member 25 and the second conical surface 14b in such a manner that a dimension of the gap is expanded progressively toward the outer side in the axial direction from the upper thrust bearing portion 24.

The lubricating oil 8 retained in the thrust bearing portion 24 fills up an inner side of a first capillary seal portion 28a formed between the first conical surface 14a and the inclined surface 25a via a gap which is approximately parallel to a rotation axis formed between the outer peripheral surface of the upper thrust plate 14 and the inner peripheral surface of the upper step portion 6d. Further, at least at a time when at least the rotor 6 stops rotating (in a stationary state), the lubricating oil is retained so as to form a gas-liquid interface within the second capillary seal portion 28b connected to the outer end portion of the first capillary seal portion 28a in the axial direction. In other words, the first capillary seal portion 28a and the second capillary seal portion 28b function as the upper capillary seal portion 28.

In this case, the inclination angle of the first conical surface 14a in the upper thrust plate 14 is set to a range between about 10 degree and 90 degree with respect to the rotation axis, preferably a range between about 55 degree and 65 degree. Further, the inclination angle of the inclined surface 25a in the upper ring-shaped member 25 is set to a range between about 10 degree and 70 degree with respect to the rotation axis, preferably a range between about 50 degree and 55 degree. At this time, the inclination angle of the first capillary seal portion 28a formed between the first conical surface 14a and the inclined surface 25a is set to a range equal to or less than about 20 degree, preferably a range equal to or less than about 10 degree. Further, the inclination angle of the second conical surface in the upper thrust plate is set to a range between about 0 degree and 45 degree with respect to the rotation axis, preferably a range between about 10 degree and 30 degree, and the vertical wall 25b of the upper ring-shaped member 25 substantially has no inclination angle except a tolerance range. At this time, the inclination angle of the second capillary seal portion 28b formed between the second conical surface 14b and the vertical wall 25b is set to a range equal to or less than about 45 degree, preferably a range equal to or less than about 15 degree.

As mentioned above, since the upper capillary seal portion 28 is inclined with respect to the rotation axis, it is possible to make a distance from the gas-liquid interface of the lubricating oil 8 to the end portion of the upper thrust bearing portion 24, that is, a dimension of the gap having a function for storing the lubricating oil 8 as the capillary seal portion, larger in comparison with the case that the capillary seal portion is structured in the direction orthogonal to the rotation axis (shown in FIG. 4). Accordingly, a volumetric capacity of the upper capillary seal portion 28 is enlarged.

Further, the first capillary seal portion 28a forming the upper capillary seal portion 28 has a larger inclination angle toward the inner side from the outer side in the radial direction with respect to the rotation axis, and the second capillary seal portion 28b continuously provided in the first capillary seal portion 28a has only a small inclination angle with respect to the rotation axis. Accordingly, when the rotor 6 is rotated at a high speed, the lubricating oil 8 retained within the first capillary seal portion 28a is pressed to the side of the upper thrust bearing portion 24 on the basis of a centrifugal force, and the gas-liquid interface of the lubricating oil 8 formed within the second capillary seal portion 28b is sucked into the first capillary seal portion 28a accordingly, so that a seal strength is reinforced.

Further, since the second capillary seal portion 28b in which the gas-liquid interface of the lubricating oil 8 is positioned at a time when at least the rotor 6 does not rotate, is formed so as to have a small inclination angle with respect to the rotation shaft, the gap between the lower surface of the upper thrust plate 14 and the flat surface of the upper step portion 6d is formed in the axial direction in the upper thrust bearing portion 24, and on the other hand, the gap in the radial direction is formed in the second capillary seal portion 28b. Therefore, in the case that the external shock is applied and the vibration in the axial direction is generated in the rotor 6, the dimension of the gap is changed in correspondence to the vibration in the upper thrust bearing portion 28, but the dimension of the gap of the second capillary seal portion 28b is hardly changed, whereby it is possible to prevent the gas-liquid interface from being broken due to the external shock mentioned above and prevent the lubricating oil 8 from being scattered to the external portion of the bearing portion in accordance with the breakage, so that it is possible to prevent the inner side and the outer side of the spindle motor from being contaminated.

In other words, since the upper capillary seal portion 28 is formed so as to have two stage inclination angles of the first capillary seal portion 28a and the second capillary seal portion 28b, it is possible to simultaneously achieve various technical purposes of the capillary seal portion constituted by the increase of the volumetric capacity within the capillary seal portion, the reinforcement of the seal strength, and the prevention of the lubricating oil from being scattered due to the external shock applied at a non-rotating time.

In this case, the minimum dimension of the gap of the upper capillary seal portion 28 is set to be larger than the dimension of the gap which is formed between the outer peripheral surface of the upper thrust plate 14 and the inner peripheral surface of the upper step portion 6d, and is approximately parallel to the rotation axis. Further, the dimension of the gap of the upper thrust bearing portion 24 in the axial direction is set to be smaller than the dimension of the gap which is formed between the outer peripheral surface of the upper thrust plate 14 and the inner peripheral surface of the upper step portion 6d, and is approximately parallel to the rotation axis.

In other words, in the case that the retaining amount of the lubricating oil 8 is reduced in the upper thrust bearing portion 24, the lubricating oil 8 retained within the upper capillary seal portion 28 on the basis of a capillary force is supplied to the upper thrust bearing portion 24 via the gap which is formed between the outer peripheral surface of the upper thrust plate 14 and the inner peripheral surface of the upper step portion 6d and is approximately in parallel to the rotation axis.

On the contrary, in the case that the lubricating oil 8 retained in the upper thrust bearing portion 24 is volume expanded due to a temperature increase or the like, the boundary surface of the lubricating oil 8 moves in the direction in which the gap dimension is more expanded within the second capillary seal portion 28b in the upper capillary seal portion 28, whereby the volume increased lubricating oil 8 is received within the upper capillary seal portion 28.

In this case, a lower capillary seal portion 30 is also formed in the outer peripheral portion of the lower thrust plate 16 with respect to the lower ring-shaped member 27 opposing thereto in the radial direction, on the basis of the same structure as that of the outer peripheral portion of the upper thrust plate 14, which is not particularly illustrated.

As mentioned above, since the dynamic pressure generating groove 22 in the upper and lower thrust bearing portions 24 and 26 is constituted by the pump-in type spiral groove in which the dynamic pressure generated thereby pressure feeds the lubricating oil 8 toward the inner side in the radial direction, the dynamic pressure generated in the upper and lower thrust bearing portions 24 and 26 has a pressure gradient in which the dynamic pressure becomes higher toward the inner side in the radial direction. Accordingly, bubbles generated in the lubricating oil 8 retained in the upper and lower thrust bearing portions 24 and 26 at a time of filling the lubricating oil 8 in the inner portion of the bearing portion or the like move to the outer side in the radial direction having a lower pressure from the inner side in the radial direction of the upper and lower thrust bearing portions 24 and 26 having a higher pressure. Further, the bubbles finally move to the upper and lower capillary seal portions 28 and 30 having the largest gap dimension and the lowest pressure in the gap retaining the lubricating oil 8, and are discharged to the air from the gas-liquid interface of the lubricating oil 8.

An annular recess portion 4a is formed in an approximately center portion of the outer peripheral surface in the shaft 4, and the recess portion 4a is provided with a pair of inclined surfaces in which the gap in the radial direction between the outer peripheral surface of the shaft 4 and the inner peripheral surface of the bearing hole 6c is inclined toward the inner side in the axial direction. Further, a communication hole 36 communicating with the air in the inner portion of the shaft 4 is open to the recess portion 4a.

The communication hole 36 is constituted by a vertical hole penetrating the center of the shaft 4 in the axial direction, a first opening portion 36a open to the recess portion 4a extended in the radial direction from the vertical hole, and a second opening portion 36b which is continuously provided in the lower capillary seal portion 30 and is open to a space communicating with the outer portion of the bearing through a micro gap defined between the inner peripheral surface of the lower seal cap 20 and the outer peripheral surface of the shaft 4.

In this case, the vertical hole is sealed by sealing members 38 and 40 constituted by an elastic member, for example, a rubber or the like, in an opening portion open to both end portions of the shaft 4 in the axial direction, after processing and cleaning the shaft 4. Accordingly, the space closer to the inner portion of the bearing than the upper and lower seal caps 18 and 20 is communicated with the air only through the micro gap formed between the inner peripheral surfaces of the upper and lower seal caps 18 and 20, and the outer peripheral surface of the shaft 4.

The air sucked into the communication hole 36 from the second opening portion 36b forms an annular gas interstitial portion 42 between a recess portion 4a to which the first opening 36a is open, and the inner peripheral surface of the sleeve 6b opposing to the recess portion 4a. Owing to the gas interstitial portion 42, the lubricating oil 8 retained in the micro gap between the outer peripheral surrace of the shaft 4 and the inner peripheral surface of the sleeve 6b forms the gas-liquid interface and is separated into upper and lower sides in the axial direction within the capillary seal portion formed between a pair of inclined surfaces of the recess portion 4a and the inner peripheral surface of the sleeve 6b.

In the inner peripheral surface of the sleeve 6b, at the position corresponding to the lubricating oil 8 which is retained in a state of being separated into the upper and lower sides, a dynamic pressure generating groove 44 for generating the dynamic pressure in the lubricating oil 8 in accordance with the rotation of the rotor 6 is formed, and an upper radial bearing portion 46 and a lower radial bearing portion 48 are structured. The dynamic pressure generating grooves 44 formed in the upper and lower radial bearing portions 46 and 48 employ herringbone grooves which pressure feed the generated dynamic pressure and the lubricating oil 8 toward the outer side in the axial direction, that is, toward the adjacent upper and lower thrust bearing portions 24 and 26, and have an unbalanced shape in the axial direction.

Since the dynamic pressure generating grooves 44 in the upper and lower radial bearing portions 46 and 48 are formed in the shapes respectively pressure feeding the lubricating oil 8 to the side of the upper and lower thrust bearing portions 24 and 26, the bubbles generated in the lubricating oil 8 retained in the upper and lower radial bearing portions 46 and 48 at a time of filling in the lubricating oil 8 move to the interface with respect to the gas interstitial portion 42 having the lower pressure from the bearing portion having the higher pressure, and are discharged to the air in the outer portion of the bearing through the communication hole 36 from the gas interstitial portion 42.

The dynamic pressure generating groove 22 formed in the upper and lower thrust bearing portions 24 and 26 is constituted by the spiral groove, and can not generate a sufficient load supporting pressure to support the rotor 6 only by itself. However, as mentioned above, the herringbone groove which is unbalanced in the axial direction is formed as the dynamic pressure generating groove 44 in the upper and lower radial bearing portions 46 and 48 adjacent to the upper and lower thrust bearing portions 24 and 26. Accordingly, when the rotor 6 is rotated, the lubricating oil 8 is pressure fed to a portion near a boundary portion between the upper thrust bearing portion 24 and the upper radial bearing portion 46 and a portion near a boundary portion between the lower thrust bearing portion 26 and the lower radial bearing portion 48. Accordingly, it is possible to generate the dynamic pressure which is required for supporting the load applied to the rotor 6 in accordance with cooperation of both the bearing portions, and it is possible to stably support the rotor 6.

Further, since the lubricating oil 8 is continuously retained in the upper and lower thrust bearing portions 24 and 26 and the upper and lower radial bearing portions 46 and 48 adjacent thereto, the gas interstitial portion 42 separating the upper and lower radial bearing portions 46 and 48 is communicated with the air through the communication hole 36, the gas-liquid interface of the lubricating oil 8 in the upper and lower thrust bearing portions 24 and 26 positioned within the upper and lower capillary seal portions 28 and 30, and the gas-liquid interface of the lubricating oil 8 retained within the upper and lower radial bearing portions 46 and 48 which are positioned within the capillary seal portion defined between a pair of inclined surfaces of the recess portion 4a and the bearing hole 6c are exposed substantially to the same air pressure.

Accordingly, in the case that the gas-liquid interface of the lubricating oil 8 retained within the upper and lower capillary seal portions 28 and 30 or the gas-liquid interface of the lubricating oil 8 retained within the capillary seal portion formed between a pair of inclined surfaces of the recess portion 4a and the inner peripheral surface of the sleeve 6b moves in a direction moving apart from the bearing portion, for example, due to the centrifugal force and the external shock to the spindle motor, another gas-liquid interface moves to a position having an equal radius of curvature of the gas-liquid interface of the lubricating oil 8 within the respective capillary seal portions at which the respective gas-liquid interface are positioned, thereby balancing. Accordingly, the lubricating oil can be stably retained without deteriorating a sealing effect.

Further, the lubricating oil 8 is continuously retained in the upper and lower thrust bearing portions 24 and 26 adjacent to the upper and lower radial bearing portions 46 and 48, and the dynamic pressure becomes maximum only in one point and does not become minimum in a range from one gas-liquid interface of the lubricating oil 8 in the hydrodynamic bearing portion to another gas-liquid interface of the lubricating oil 8. Accordingly, even in the case that the bubbles are contained in the lubricating oil 8, the bubbles can be automatically removed from the gas-liquid interface positioned within the taper-shaped gap having the minimum pressure to the air in the outer portion of the bearing.

As mentioned above, the bubbles generated in the lubricating oil 8 retained in each of the hydrodynamic bearing portions sequentially move to the low pressure side, and are discharged to the air from each of the gas-liquid interface of the lubricating oil 8. Accordingly, the bubbles do not stay in the lubricating oil 8 retained in each of the hydrodynamic bearing portions. Further, since no special structure is required for discharging the bubbles, the structure of the spindle motor can be simplified.

A difference in a flow speed of an air flow generated in accordance with the rotation of the rotor 6 is generated between the gap in the axial direction formed between the upper and lower thrust plates 14 and 16 and the upper and lower seal caps 18 and 20 at a time when the spindle motor is rotated, and the gap in the radial direction formed by the outer peripheral surface of the shaft 4 and the upper and lower seal caps 18 and 20, by setting the radial dimension of the gap formed between the inner peripheral surfaces of the upper and lower seal caps 18 and 20 and the outer peripheral surface of the shaft 4 to be as short as possible. Accordingly, since a vapor pressure can be kept high near the gas-liquid interface by making an outflow resistance toward the external portion of the spindle motor with respect to a vapor (an oil mist) generated by the vaporized lubricating oil 8, it is possible to prevent a further transpiration of the lubricating oil 8.

In this case, if an oil repellent, for example, constituted by a fluorine material is applied to the portion near the gas-liquid interface of the lubricating oil 8, in the shaft 4, the upper and lower seal caps 18 and 20, the upper and lower ring-shaped members 25 and 27, and the upper and lower thrust plates 14 and 16, it is possible to more effectively prevent the lubricating oil 8 from leaking out to the external portion of the spindle motor on the basis of an oil migration phenomenon, at a time when the spindle motor stops rotating at which no centrifugal force is applied to the lubricating oil 8.

Figure 3:
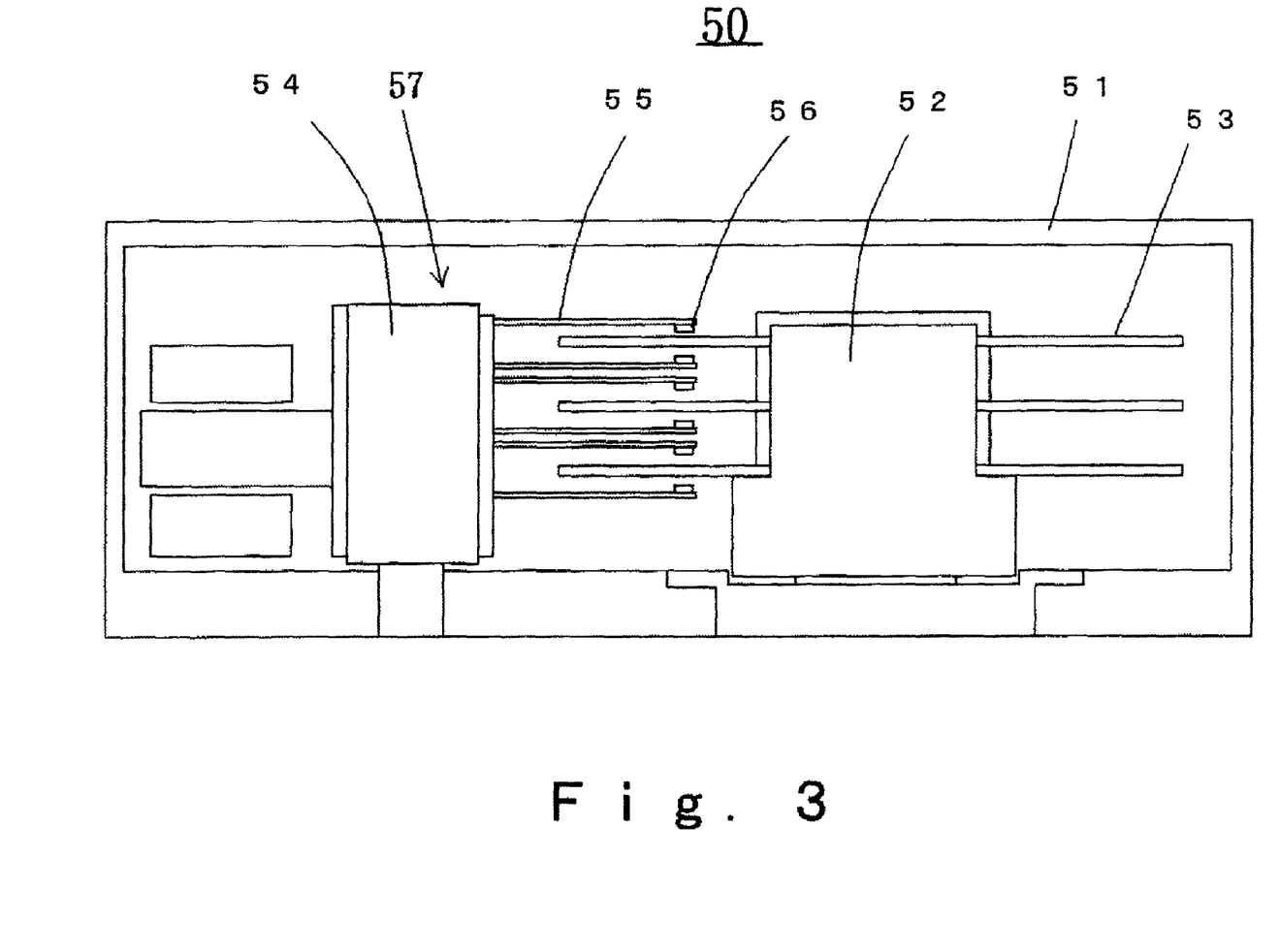
FIG. 3 is a schematic view showing a skeleton structure of a disc drive apparatus provided with the spindle motor shown in FIG. 1.

Next, a description will be given of an internal structure of a general disc drive apparatus 50 with reference to FIG. 3. An inner portion of a housing 51 forms a clean space having an extremely small amount of dusts or the like, and a spindle motor 52 to which disc-shaped disc plates 53 recording information are attached is placed in the inner portion of the housing 51. In addition, a head moving apparatus 57 reading and writing the information with respect to the disc plates 53 is arranged in the inner portion of the housing 51, and the head moving apparatus 57 is constituted by a head portion 56 reading and writing the information on the disc plates 53, an arm 55 supporting the head, and an actuator portion 54 moving the head 56 and the arm 55 to a desired position on the disc plate 53.

It is possible to support the rotation at a high speed and at a high precision by using the spindle motor illustrated in FIG. 1 as the spindle motor 52 of the disc drive apparatus 50, it is possible to correspond to a high volumetric capacity of the disc plate 53, and it is further possible to prevent the inner portion of the housing 51 from being contaminated by the lubricating oil scattered from the hydrodynamic bearing portion of the spindle motor 52. Accordingly, it is possible to prevent a read and write error of the recording data on the disc plate 53 from being generated as much as possible, and it is possible to obtain the structure which is excellent in a reliability and a durability.

Figure 5:
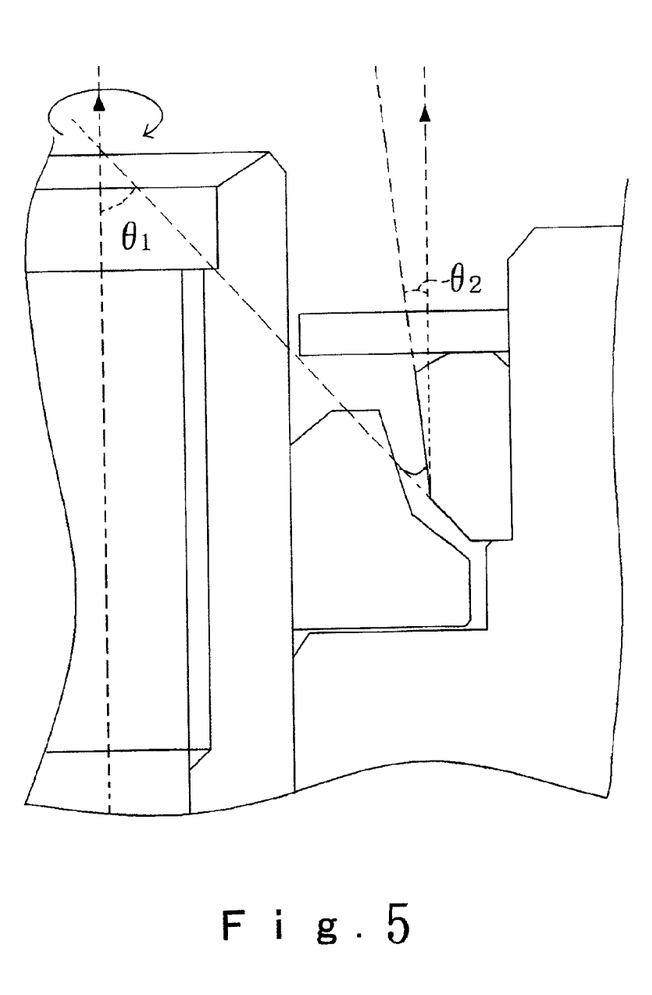
FIG. 5 is a view showing a inclination angle of an inner peripheral surface of a sleeve in accordance with the present invention, by using a cross sectional view schematically showing a skeleton structure of a spindle motor in accordance with an example of the present invention.

In this case, as shown in FIG. 5, the first inner peripheral surface of the sleeve structuring the first capillary seal portion in accordance with the present invention forms a first angle $\theta_1$, with respect to the rotation axis, and the angle $\theta_1$ employs an angle value having relation $0<\theta_1 \leq 90°$. Further, the second inner peripheral surface of the sleeve structuring the second capillary seal portion in accordance with the present invention forms a second angle $\theta_2$ with respect to the rotation axis, and the angle $\theta_2$ employs an angle value having relation $0 \leq \theta_2 < 90°$.

The description is given above of the embodiment of the hydrodynamic bearing, the spindle motor using the same and the disc drive apparatus provided with the spindle motor in accordance with the present invention, however, the present invention is not limited to the embodiment mentioned above, but can be modified and changed variously within the scope of the present invention.

For example, the gap which is formed between the upper and lower thrust plates 14 and 16 and the inner peripheral surfaces of the upper and lower step portions 6d and 6e and is approximately parallel to the rotation axis is provided on the basis of the necessity that the flat surface is formed in the outer peripheral end portions of the upper and lower thrust plates 14 and 16 for the tool to hold the outer peripheral end portions of the upper and lower thrust plates 14 and 16, at a time of processing the upper and lower thrust plates 14 and 16. However, in the case that such the necessity does not exist, the conical surface may be formed continuously in the outer peripheral end portions of the lower surface and the upper surface of the upper and lower thrust plates 14 and 16 without the provision of the outer peripheral end portions of the upper and lower thrust plates 14 and 16.

Further, the present invention can be applied not only to the spindle motor in which the sleeve is rotated, but also to a spindle motor in which a shaft is rotated.

Further, in the embodiment mentioned above, the rotation of the rotor 6 is supported by using the hydrodynamic bearing portion constituted by a pair of radial bearing portions 46 and 48 and a pair of thrust bearing portions 24 and 26. However, the structure may be made such that a load in a radial direction and a load in an axial direction applied to the rotor are simultaneously supported by one hydrodynamic bearing portion.

Figure 6:
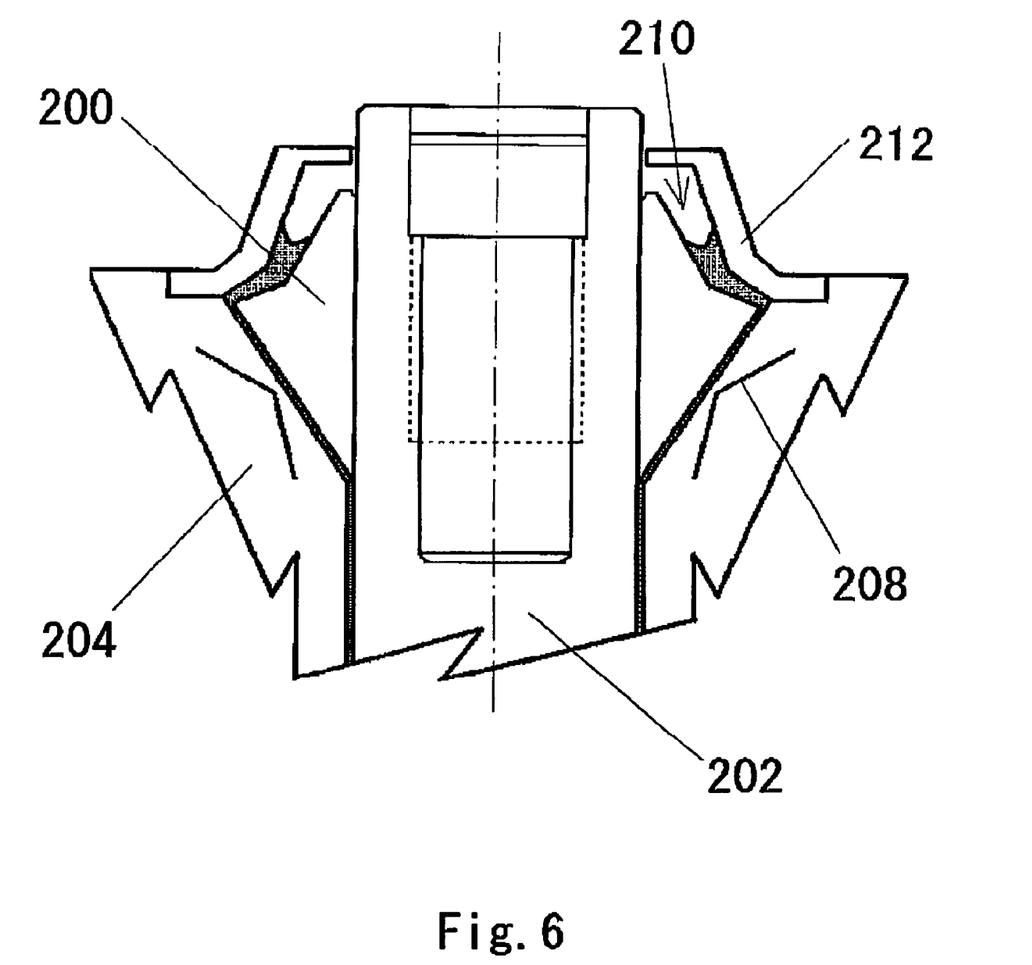
FIG. 6 is a partly enlarged cross sectional view showing another embodiment of the present invention.

For example, the present invention can be applied also to the structure disclosed in U.S. Patent Application No. 2003-30222. In other words, shown in FIG. 6 the spindle motor is provided with a pair of hycirodynamic bearing portions in an axial direction, each of the hydrodynamic bearing portions being constituted by an inclined surface of a conical member 200 fixed to an outer peripheral surface of the shaft 202, an inner peripheral surface of the sleeve 204 opposing to the inclined surface of the conical member 200 in a radial direction, a micro gap formed between the inclined surface of the conical member 200 and the inner peripheral surface of the sleeve 204 or the outer peripheral inclined surface of the conical member 200. The rotor is supported by forming a dynamic pressure generating grooves 208 in the inner peripheral surface of the sleeve 204. Further, a capillary seal portion 210 is formed between an inner peripheral surface of a cap member 212 fixed to an upper side in the axial direction of the sleeve 204, and an outer peripheral surface of the conical member 200 continuously provided in the hydrodynamic bearing portion. The same operational effects as those of the embodiment mentioned above can be obtained by using the capillary seal portions 28 and 30 in accordance with the present invention for the spindle motor.

The disclosure of Japanese Patent Application No. 2003-079928 filed Mar. 24, 2003 including specification, drawings and claims is incorporated herein by reference in its entirety.

The invention claimed is:

1. A hydrodynamic bearing in a spindle motor having a rotation axis, comprising:
a shaft;
a sleeve relatively rotated with respect to said shaft;
a bearing portion including a micro gap formed between said shaft and said sleeve, a lubricating oil retained as a working fluid in said micro gap, and a dynamic pressure generating groove formed on at least one side of an outer peripheral surface of said shaft and an inner peripheral surface of said sleeve in said micro gap, for generating a dynamic pressure so as to support a rotation of said shaft or said sleeve;
a capillary seal portion adjoining said bearing portion, the capillary seal portion comprising:
a first capillary seal portion adjoining said bearing portion, and having a first radial gap between an outer surface of said shaft and an first inner peripheral surface of said sleeve, said first radial gap at least widening the further along said rotation axis the radial dimension of said gap is from said bearing portion; and
a second capillary seal portion adjoining said first capillary seal portion, and having a second radial gap between an outer surface of said shaft and an second inner peripheral surface of said sleeve, said second radial gap at least widening the further along said rotation axis the radial dimension of said gap is from said bearing portion;
wherein
a first radial separation of the first inner peripheral surface from the rotation axis at least shortens the further along said rotation axis the first radial separation is from said bearing portion, and said first inner peripheral surface forms a first angle $\theta_1$, whose value is in the range a $0<\theta_1 \leqq 90°$, with respect to said rotation axis,
a second radial separation of the second inner peripheral surface from the rotation axis at least shortens the further along said rotation axis the second radial separation is from said bearing position, and said second inner peripheral surface forms a second angle $\theta_2$, whose value is in the range $0 \leqq \theta_2 < 90°$, with respect to said rotation axis, and
said first angle $\theta_1$ and said second angle $\theta_2$ have a relation $\theta_1 > \theta_2$.

2. The hydrodynamic bearing as claimed in claim 1, wherein said second angle $\theta_2$ has a relation $\theta_2 > 0$.

3. The hydrodynamic bearing as claimed in claim 1, wherein at least in a stationary state, said lubricating oil forms a gas-liquid interface in said second inner peripheral surface.

4. The hydrodynamic bearing as claimed in claim 1, wherein said shaft is provided with a shaft annular member integrally formed with said shaft or fixed as an independent body to the shaft, and a part or all of said capillary seal portion is formed between said shaft annular member and said sleeve.

5. The hydrodynamic bearing as claimed in claim 4, wherein a sleeve annular member is attached to said sleeve, and a part or all of said capillary seal portion is formed between said sleeve annular member and said shaft annular member.

6. The hydrodynamic bearing as claimed in claim 5, wherein a pair of said bearing portions are provided so as to be apart from each other with respect to said shaft in an axial direction, and a pair of said shaft annular members are attached to said shaft in correspondence to said pair of bearing portions.

7. The hydrodynamic bearing as claimed in claim 6, wherein a pair of said bearing portions are provided so as to be apart from each other with respect to said shaft in said axial direction, and a pair of said sleeve annular members are attached to said sleeve in correspondence to said pair of bearing portions.

8. The hydrodynamic bearing as claimed in claim 1, wherein an annular conical member in which an outer diameter is expanded in an axial direction is provided in said shaft so as to be integrally formed with said shaft or to be fixed to the shaft, and a part or all of said capillary seal portion is formed between said conical member and said sleeve.

9. The hydrodynamic bearing as claimed in claim 8, wherein a cap member is attached to said sleeve, and a part or all of said capillary seal portion is formed between said cap member and said conical member.

10. The hydrodynamic bearing as claimed in claim 9, wherein a pair of said bearing portions are provided so as to be apart from each other with respect to said shaft in an axial direction, and a pair of said conical members are attached to said shaft in correspondence to said pair of bearing portions.

11. The hydrodynamic bearing as claimed in claim 10, wherein a pair of said bearing portions are provided so as to be apart from each other with respect to said shaft in said axial direction, and a pair of said cap members are attached to said sleeve in correspondence to said pair of bearing portions.

12. A spindle having a rotation axis comprising:
a stator fixed at a bracket with which one side of a shaft and a sleeve;
a rotor magnet secured another of said shaft and said sleeve and generating a rotating magnetic field in cooperation with said stator; and
a hydrodynamic bearing comprising:
said shaft;
said sleeve relatively rotated with respect to said shaft;
a bearing portion including a micro gap formed between said shaft and said sleeve, a lubricating oil retained as a working fluid in said micro gap, and a dynamic pressure generating groove formed on at least one side of an outer peripheral surface of said shaft and an inner peripheral surface of said sleeve in said micro gap, for generating a dynamic pressure so as to support a rotation of said shaft or said sleeve;
a capillary seal portion adjoining said bearing portion, the capillary seal portion comprising:
a first capillary seal portion adjoining said bearing portion, and having a first radial gap between an outer surface of said shaft and an first inner peripheral surface of said sleeve, said first radial gap at least widening the further along said rotation axis the radial dimension of said gap is from said bearing portion; and
a second capillary seal portion adjoining said first capillary seal portion, and having a second radial gap between an outer surface of said shaft and an second inner peripheral surface of said sleeve, said second radial gap at least widening the further along said rotation axis the radial dimension of said gap is from said bearing portion;
wherein
a first radial separation of the first inner peripheral surface from the rotation axis at least shortens the further along said rotation axis the first radial separation is from said bearing portion, and said first inner peripheral surface forms a first angle $\theta_1$, whose value is in the range $0<\theta_1\leq 90°$, with respect to said rotation axis, a second radial separation of the second inner peripheral surface from the rotation axis at least shortens the further along said rotation axis the second radial separation is from said bearing portion, and said second inner peripheral surface forms a second angle $\theta_2$, whose value is in the range $0\leq\theta_2<90°$, with respect to said rotation axis, and said first angle $\theta_1$ and said second angle $\theta_2$ have a relation $\theta_1<\theta_2$.

13. The spindle motor as claimed in claim 12, wherein said second angle $\theta_2$ has a relation $\theta_2>0$.

14. A disc drive apparatus to which a disc-shaped recording medium capable of recording information is attached, comprising:

a housing;

a spindle motor fixed to an inner portion of said housing and rotating said recording medium; and a means for writing or reading the information at a desired position of said recording medium, wherein said spindle motor comprises:

a stator fixed at a bracket with which one side of a shaft and a sleeve;

a rotor magnet secured another of said shaft and said sleeve and generating a rotating magnetic field in cooperation with said stator; and a hydrodynamic bearing comprising:

said shaft;

said sleeve relatively rotated with respect to said shaft;

a bearing portion including a micro gap formed between said shaft and said sleeve, a lubricating oil retained as a working fluid in said micro gap, and a dynamic pressure generating groove formed on at least one side of an outer peripheral surface of said shaft and an inner peripheral surface of said sleeve in said micro gap, for generating a dynamic pressure so as to support a rotation of said shaft or said sleeve;

a capillary seal portion adjoining said bearing portion, wherein the capillary seal portion comprising:

a first capillary seal portion adjoining said bearing portion, and having a first radial gap between an outer surface of said shaft and an first inner peripheral surface of said sleeve, said first radial gap at least widening the further along said rotation axis the radial dimension of said gap is from said bearing portion; and a second capillary seal portion adjoining said first capillary seal portion, and having a second radial gap between an outer surface of said shaft and an second inner peripheral surface of said sleeve, said second radial gap at least widening the further along said rotation axis the radial dimension of said gap is from said bearing portion;

wherein a first radial separation of the first inner peripheral surface from the rotation axis at least shortens the further along said rotation axis the first radial separation is from said bearing portion, and said first inner peripheral surface forms a first angle $\theta_1$ in a, whose value is in the range $0<\theta_1\leq 90°$, with respect to said rotation axis, a second radial separation of the second inner peripheral surface from the rotation axis at least shortens the further along said rotation axis the second radial separation is from said bearing portion, and said second inner peripheral surface forms a second angle $\theta_2$, whose value is in the range $0\leq\theta_2<90°$, with respect to said rotation axis, and said first angle $\theta_1$ and said second angle $\theta_2$ have a relation $\theta_1>\theta_2$.

15. The disc drive apparatus as claimed in claim 14, wherein said second angle $\theta_2$ has a relation $\theta_2>0$.

* * * * *